(12) United States Patent
Hsu (10) Patent No.: US 7,391,364 B2
(45) Date of Patent: Jun. 24, 2008

(54) GLOBAL POSITIONING SYSTEM RECEIVER AND CORRELATING CIRCUIT THEREOF

(75) Inventor: Chia-Chang Hsu, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 269 days.

(21) Appl. No.: 10/979,342

(22) Filed: Nov. 1, 2004

(65) Prior Publication Data

US 2005/0151684 A1    Jul. 14, 2005

(30) Foreign Application Priority Data

Nov. 6, 2003    (TW) ................. 92131031 A (51) Int. Cl.
*G01S 1/00* (2006.01)
(52) U.S. Cl. ................................. 342/357.06
(58) Field of Classification Search ............ 342/357.06, 342/357.12–357.13, 357.15, 378
See application file for complete search history.

(56) References Cited

U.S. PATENT DOCUMENTS

RE35,498 E * 4/1997 Barnard ................. 342/357.09
5,896,304 A * 4/1999 Tiemann et al. ................. 708/5
6,009,118 A 12/1999 Tiemann et al. ............. 375/208
6,383,046 B2 5/2002 Shinoda .......................... 445/3
6,930,634 B2 * 8/2005 Peng et al. ............. 342/357.01

FOREIGN PATENT DOCUMENTS

| CN | 1114125 | 12/1995 |
| CN | 1225175 | 8/1999 |
| CN | 1287273 | 3/2001 |
| CN | 1325029 | 12/2001 |

* cited by examiner

*Primary Examiner*—Thomas H. Tarcza
*Assistant Examiner*—Nga X Nguyen
(74) *Attorney, Agent, or Firm*—J.C. Patents (57) ABSTRACT

A global positioning system receiver and a correlating circuit thereof are disclosed. They sequentially and in parallel generate the portion of bits of the C/A code representing the satellite, sequentially and in parallel generate the portion of bits of the corrected frequency code of Doppler effect, and sequentially outputs the portion of bits of the C/A code and the corrected frequency code therefrom for multiplying the data and the IF data and for adding the products therefrom for generating the total summation value. Therefore, the correlating circuit having portable process is formed. Moreover, an external memory is used to store the sample digital data for reducing costs.

16 Claims, 6 Drawing Sheets

GLOBAL POSITIONING SYSTEM RECEIVER AND CORRELATING CIRCUIT THEREOF

CROSS-REFERENCE TO RELATED APPLICATION

This application claims the priority benefit of Taiwan application serial no. 92131031, filed on Nov. 6, 2003.

BACKGROUND OF THE INVENTION

1. Field of the Invention

The present invention relates to a communication apparatus, and more particularly to a Global Positioning System (GPS) receiver and a correlating circuit thereof.

2. Description of the Related Art

Because of advance of technology, electronic devices have been widely used in the daily life of human. As to a global positioning system (GPS) receiver, it becomes more and more available and is used. For example, the navigation system installed in cars can help the drivers identify the location and direction thereof and avoid the lost.

Figure 1:
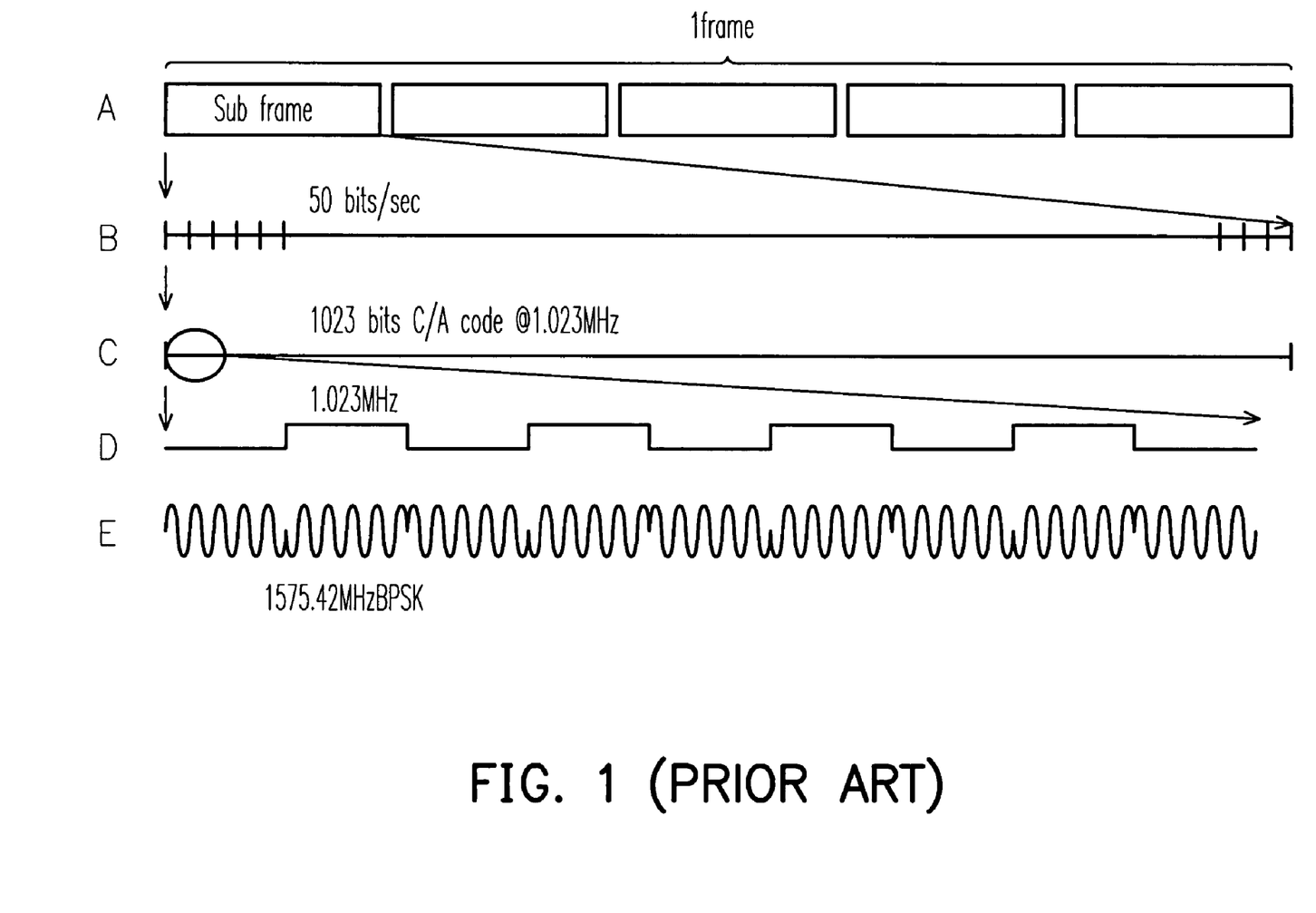
FIG. 1 is a schematic drawing of a signal frame transmitted from a satellite.

FIG. 1 is a schematic drawing of a signal frame transmitted from a satellite. The A serial represents that the satellite transmits a frame for each 30 seconds which includes 5 sub-frames and each sub-frame with 6 seconds. The B serial represents that the frame data includes the 50 bits/sec navigation data. It means that the transmission time for each bit of the navigation data is 20 ms. Prior to transmission the navigation data and the C/A code for identifying the satellite of the C serial are performed exclusive or logic operation for generating the D serial data. The frequency of the C/A code is 1.023 MHz which transmits 1023 bits C/A code by per ms. The length of the C/A code is 1023 bits. During the transmission the data are carried by a 1575.42 MHz carrying wave for performing bi-phase shift key (BPSK) by the output from the operation of the navigation data and the C/A code as shown E serial. The modulated signals are then transmitted.

For a GPS receiver, a RF front end serves receiving the modulated signals for the sampled digital data, and a correlating circuit serves searching the C/A code for identifying the satellite whose data can be received. To date, 24 satellites are evenly distributed on six orbits. Generally, three or four satellites are sufficient to identify the location. The more the satellites are, the more precise the location is. In addition, because of the Doppler effect, the correlating circuit refers to a corrected frequency code when searching the C/A code. If the sampled digital data received by the correlating circuit is IF data (Please provide the full spelling for IF), and the C/A code for searching the satellite is Code, and the corrected frequency code is Doppler, the correlating circuit can find out the maximum for identifying the C/A code offset and Doppler corrected frequency of the satellite whose data can be received by the following formula:

$$\sum_{0}^{Nms} IF * Doppler * Code \quad (1)$$

The "*" represents a multiplication operation, such as exclusive or logic operation, or a multiplication of a single bit. "N ms" means the period of time of receiving the data, which is adjustable. When the period of time increases, the S/N ratio also increases which means search result is slightly affected by the noise. Following is a C/A code searching example, wherein the length of the C/A code is 10237 bits. (Generally, the length of the C/A code is 1023 bits.)

Figure 2:
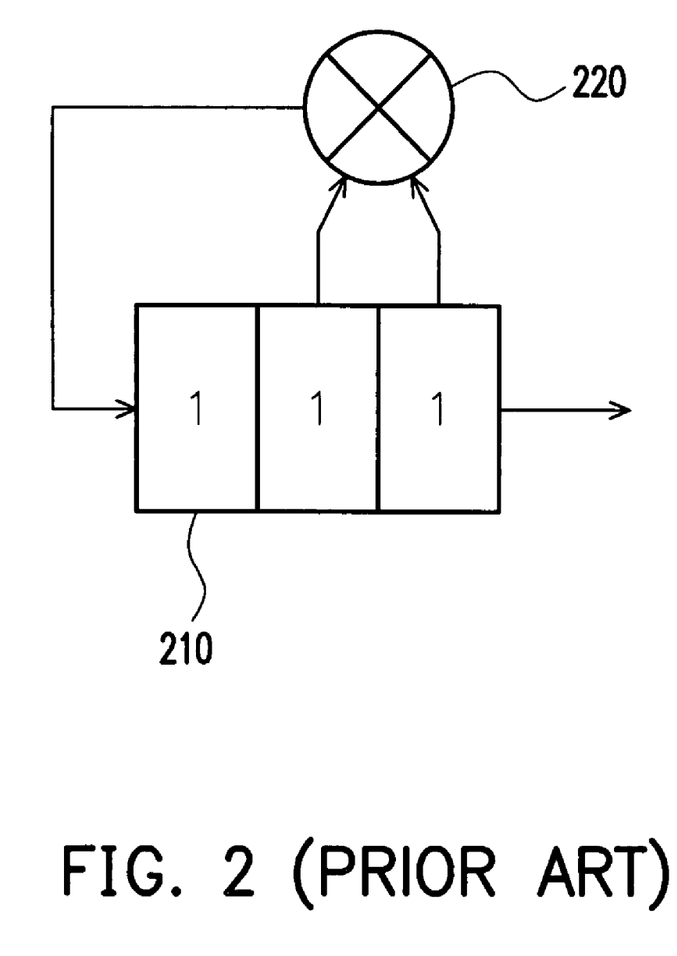
FIG. 2 is a schematic drawing of a circuit generating the 7-bit C/A code.

Referring to FIG. 2, it is a schematic drawing of a circuit generating the 7-bit C/A code. The circuit comprises a 3-bit shift register 210 and a multiplier 220. The input of the multiplier 220 is a two-bit output of the shift register 210; the output of the multiplier 220 is inputted into the shift register 210 responding to the output of the two bits. Therefore, the circuit, therefore, generates a 7-bit cycle C/A code, i.e. 1110010.

In order to search the 7-bit C/A code and determine the offset of the IF data, the correlating circuit of the GPS receiver uses the 7-bit C/A code, i.e., 1110010, and the other codes with different offset, such as 0111001, 1011100, 0101110, 0010111, 1001011, 1100101, etc, to perform multiplication and summation with the IF data. The multiplication is, for example, the exclusive or logic operation shown in formula (1). If the C/A code has two-bit offset, the codes with different offset are, for example, 1110010, 0101110, 1011100, 0101110, 1001011, 1100101, etc. After the exclusive or logic operation and the summation operation, only "1011100" has a value "0"; the others have a value "4". If "4" is deemed as the zero point of the coordinate, "0" becomes "−4" in the coordinate. After the square and radical operation, it generates the maximum "4" which can be detected by a peak detector.

Figure 3:
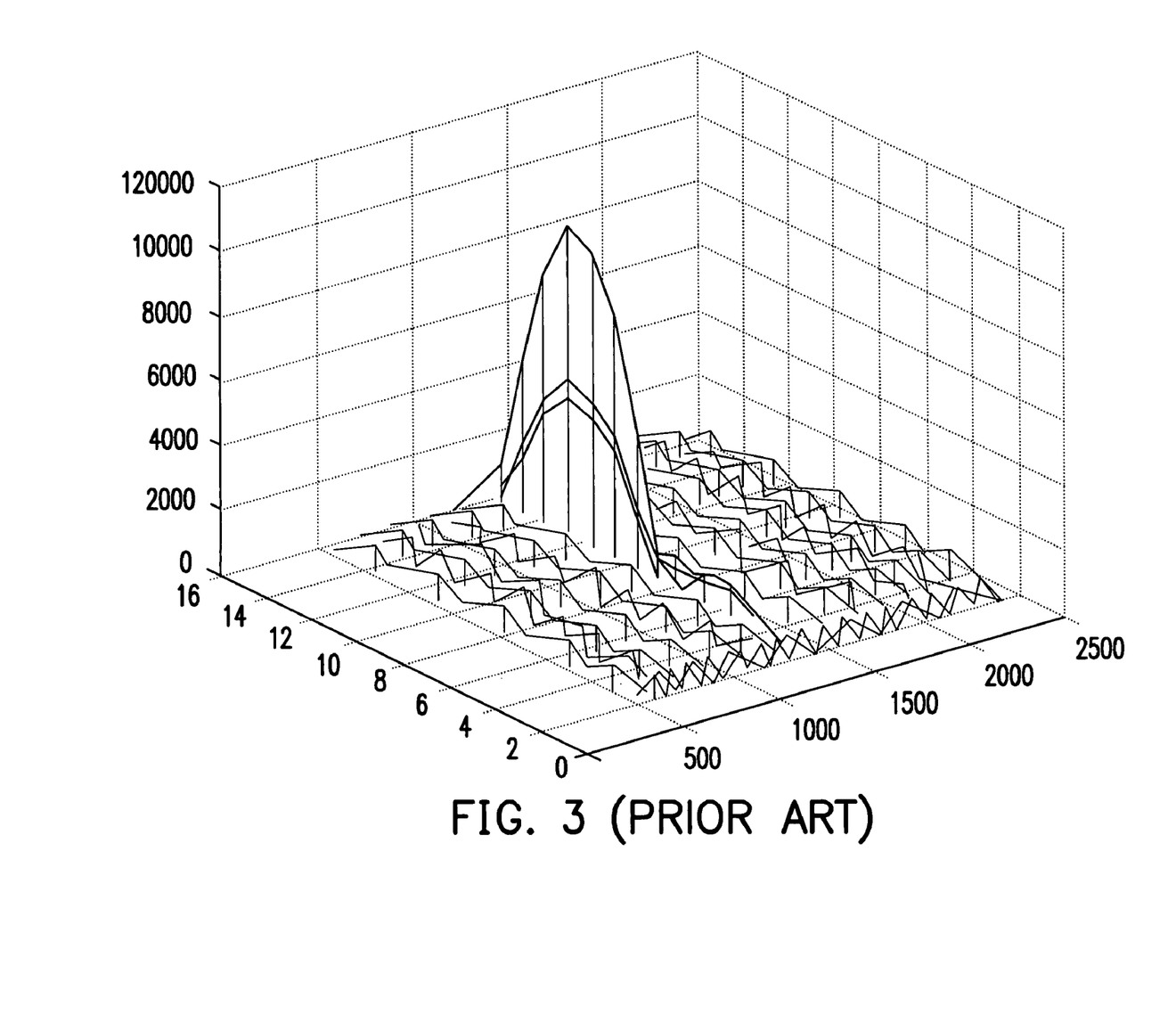
FIG. 3 is a waveform of a searching result of a correlating circuit.

Referring to FIG. 3, it is a waveform illustrating a searching result of a correlating circuit. In addition to the offset of the C/A code, the correlating circuit also searches the corresponding Doppler corrected frequency. A corresponding C/A code offset with peak value and Doppler corrected frequency are acquired for tracking satellite in order to obtain navigation data with correct offset of the C/A code and the Doppler corrected frequency.

Figure 4:
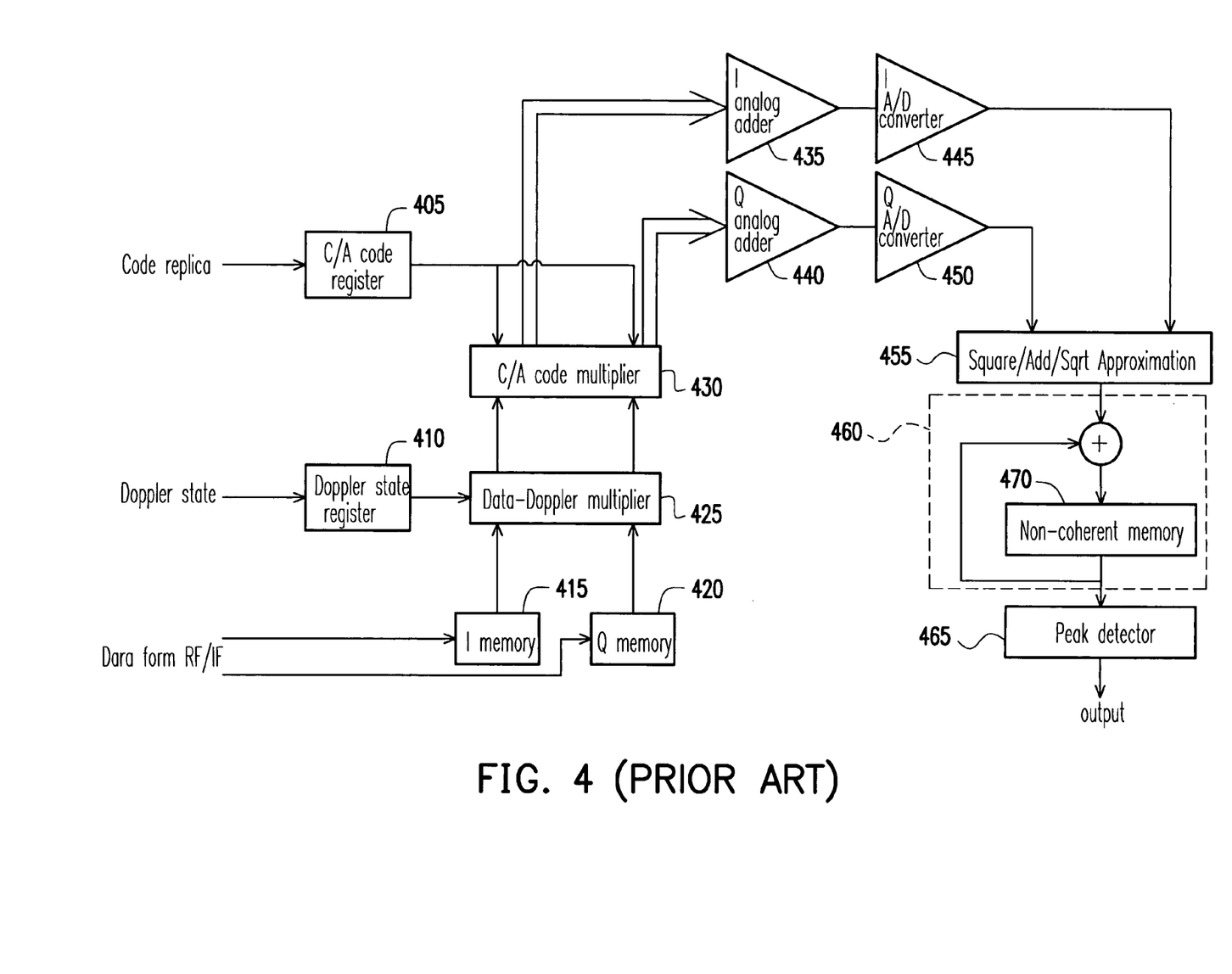
FIG. 4 is a schematic block diagram of a prior art correlating circuit.

FIG. 4 is a schematic block diagram of a prior art correlating circuit. The correlating circuit includes a C/A code register 405, a Doppler corrected frequency code register 410, an I memory 415, a Q memory 420, a Doppler multiplier 425, a C/A code multiplier 430, an I analog adder 435, a Q analog adder 440, an I A/D converter 445, a Q A/D converter 450, a square and radical calculator 455, an integrator 460 and a peak detector 465.

The C/A code register 405 serves storing the C/A codes to be searched. The Doppler corrected frequency code register 410 serves storing the Doppler corrected frequency code to be searched. The I memory 415 stores the IF data received by the RF front end. The Q memory 420 stores the IF data with 90° phase shift. The I memory 415 and the Q memory 420 can store the IF data for about 20 ms for the multiplication of formula (1). The data are going to be processed by the Doppler multiplier 425 and the C/A code multiplier 430 for generating the product of each bit. After the process of the I analog adder 435 and the Q analog adder 440, the summation of the product of each bit is acquired. After the process of the I A/D converter 445 and the Q A/D converter 450, the digital data are acquired.

Then, after the process of the square and radical calculator 445, the absolute values of the digital data are generated. By the integration of the integrator 460, the value is then stored in the non-coherent memory 470. It can reduce the noise influence. The longer the integration time is, the higher the S/N ratio is. It means the noise influence is reduced. The integrated value can be detected by the peak detector 465 for acquiring correct offset of the C/A code and the Doppler corrected frequency.

The prior art correlating circuits are disclosed in U.S. Pat. Nos. 5,896,304 and 6,009,118, which have following disadvantages:

1. The correlating circuit uses analog adders for generating the summation of the product of each bit and the total summation of the product of the 1023-bit C/A code. When the process is changed, the A/D converters should be redesigned. Therefore, the process portability is degraded.
2. A large internal memory for storing the 20-ms IF memory is required. It will cause the rise of cost.

Additionally, although the correlating circuit disclosed in U.S. Pat. No. 6,383,046 improved process portability, C/A code bits are still serially converted followed by processed in parallel, and there is not a buffer working as a sampled data register, thus the operation is not substantially parallel.

SUMMARY OF THE INVENTION

Accordingly, the present invention provides a global positioning system (GPS) receiver and correlator thereof, where portion of the C/A code generating unit of the C/A code bits to be searched are outputted sequentially, and portion of the Doppler generating unit of the frequency code to be corrected are outputted sequentially. Therefore, the present invention provides the multiplying unit for multiplying with IF data, and provides the digital adder for summing up products of portion of bits that are sequentially outputted, so as to implement a correlator with portable process. In addition, the C/A code generating unit and the Doppler generating unit can generate a plurality of bits in parallel. It also includes the data receiving register for temporarily storing the IF data. The better parallel processing is performed. Moreover, because of the application of the external memory for storing the IF data, the costs are reduced.

In order to achieve the objects described, the present invention discloses a GPS receiver, which comprises: a RF front end, a data receiving register, an interface controller, a correlator, a data extractor and a navigation processor. The RF front end is adapted to receive, demodulate and sampled a RF signal for generating an IF data to be stored, for example, in the navigation processor. The interface controller is coupled to data receiver and external memory, for sequentially removing stored IF data from the external memory to the data receiver. The correlator is coupled to the data receiving register and adapted to receive the IF data and identify a satellite that transmits the IF data according to an operation of the IF data, a C/A code of the satellite, and a corrected frequency code for correcting Doppler effect. The data extractor is coupled to the correlator, for identifying satellite information so as to extract navigation data carried with RF signal from the foregoing IF data. The navigation processor is coupled to the data extractor and adapted to receive the navigation data for generating a longitude-latitude data and a standard time data.

In the preferred embodiment of the present invention, the data receiving register has two regions for storing the IF data with different time periods, and the interface controller uses the memory regions in turn. The data receiving register serves as a ping-pong buffer.

In the embodiment of the present invention, the correlating circuit of the GPS receiver comprises: a C/A code generating unit, a Doppler generating unit, a multiplication unit and digital summation and peak detector. The C/A code generating unit sequentially and in parallel generates the portion of bits of the C/A code representing the satellite. The Doppler generating unit, sequentially and in parallel generates the portion of bits of the corrected frequency code for correcting Doppler effect and sequentially outputs the portion of bits of the corrected frequency code therefrom. The multiplication unit is coupled to the C/A code generating unit and to the Doppler generating unit, sequentially multiplying the portion of bits of the C/A code from the C/A code generating unit, the portion of bits of the corrected frequency code from the parallel Doppler generating unit, and the IF data. The digital summation and peak detector is coupled to the multiplication unit, adding the product therefrom for generating the total summation value and searching the maximum thereof for identifying the satellite transmitting the IF data.

In an embodiment, the C/A code generating unit comprises a C/A code phase loop controller adapted to sequentially output the portion of bits of the C/A code. The Doppler generating unit comprises a Doppler frequency loop controller adapted to sequentially output the portion of bits of the corrected frequency code.

In an embodiment, the digital summation and peak detector comprises: a digital adder, a square and radical calculator, an integrator, and a peak detector. The digital adder is coupled to the multiplication generating unit and adapted to adding the products therefrom for generating an I summation and a Q summation. The square and radical calculator is coupled to the digital adder, for receiving the I and Q summations and square-rooting a quadratic sum. The integrator is coupled to the square and radical calculator and adapted to integrate an output therefrom during a period of time. The peak detector is coupled to the integrator and adapted to search a maximum of the I and Q summations for identifying the satellite transmitting the IF data.

In an embodiment, the period of time for summation is adjustable.

In an embodiment, the multiplication unit can multiply 64 bits each time.

In an embodiment, the GPS receiver further comprises N correlator, which have a structure similar to that of the correlator, wherein N is 12. Each correlator searches the data of satellites and tracks the data of a satellite for enhancing the searching speed.

Accordingly, the present invention sequentially and in parallel generates the portion of bits of the C/A code representing the satellite, sequentially generates the portion of bits of the corrected frequency code for correcting Doppler effect, and sequentially outputs the portion of bits of the corrected frequency code therefrom for multiplying the data and the IF data and for adding the products therefrom for generating the total summation value. Therefore, the correlating circuit having portable process is formed and applied to a GPS receiver. In addition, the data receiving register temporarily stores the IF data for about 20 ms. The better parallel processing is therefore performed. Moreover, because of the application of the external memory for storing the IF data, the costs are reduced.

In order to make the aforementioned and other objects, features and advantages of the present invention understandable, a preferred embodiment accompanied with figures is described in detail below.

DESCRIPTION OF SOME EMBODIMENTS

Figure 5:
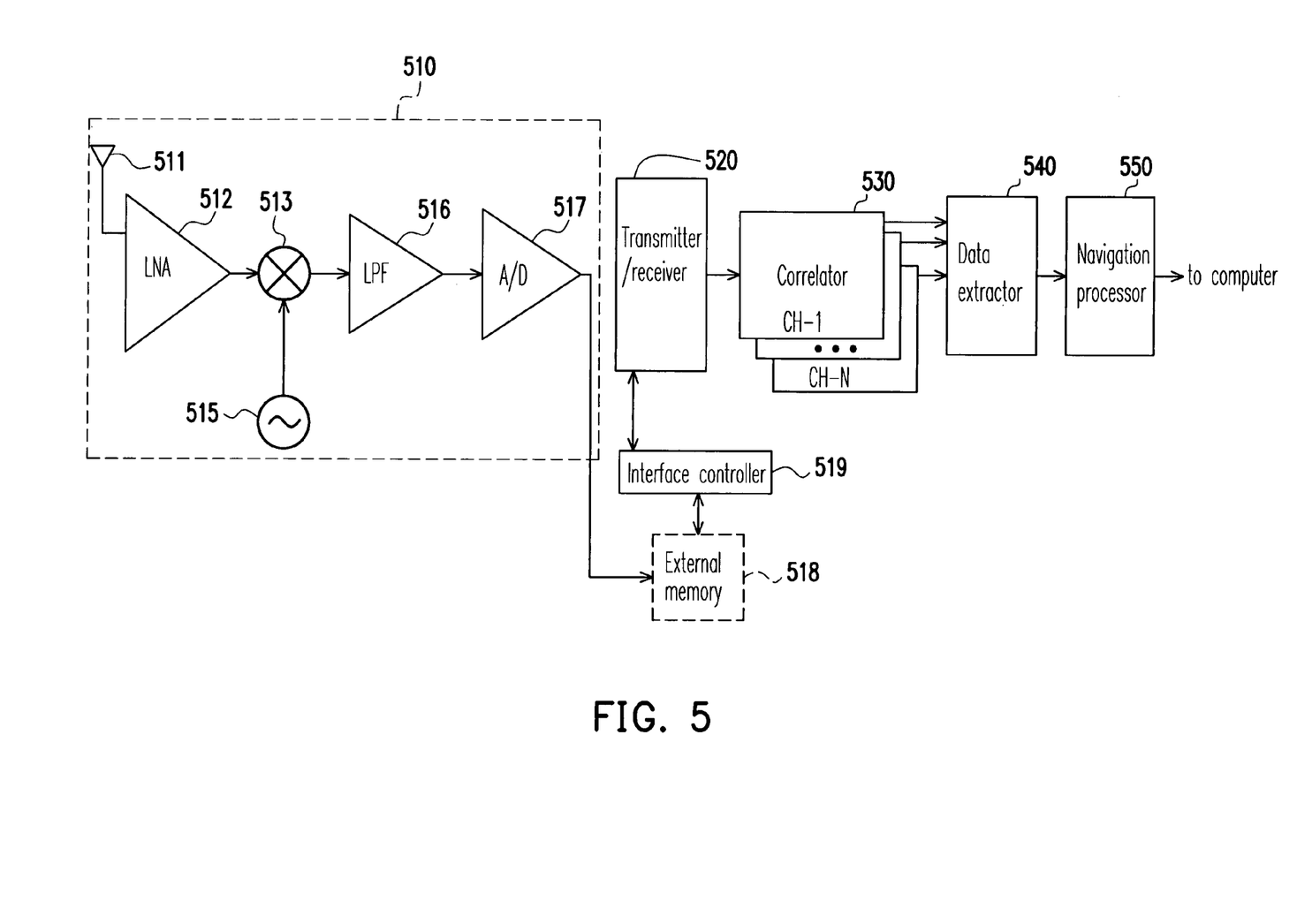
FIG. 5 is a schematic block diagram showing a preferred global positioning system (GPS) receiver of the present invention.

FIG. 5 is a schematic block diagram showing a preferred global positioning system (GPS) receiver of the present invention. The GPS receiver 500 comprises: a radio frequency (RF) front end 510, an interface controller 519, a data receiving register 520, a correlator 530, a data extractor 540 and a navigation processor 550. The RF front end 510 is composed of an antenna 511, a low noise amplifier 512, a mixer 513, a local oscillator 515, a low-pass filter 516 and a A/D converter 517. The external memory can be, for example, in the navigation processor 550. When the GPS receiver is in the searching mode, the memory of the navigation processor 550 is not used. Therefore, the application of the memory thereof for storing the IF data can reduce the costs.

The antenna 511 is adapted to receive RF signals from satellites. The low noise amplifier 512 amplifies the RF signals which are demodulated by the mixer 513, the local oscillator 515 and the low-pass filter 516 for receiving the base-frequency signals therein. The A/D converter 517 samples the signals for generating IF signals. The IF data generated with N time of the C/A code transmission frequency, wherein N is an integral. For example, the frequency is 1.023 MHz and N is 1; 1023 IF data can be acquired during 1 ms. The IF data can be stored in the external memory 518. In order to reduce the effect of noise during receiving data, following the formula (1), the data receiving register 520 can store the IF data for 20 ms if the correlating circuit calculating the IF data with 20 ms.

The interface controller 519 sequentially couples the IF data from the external memory 518 to the data receiving register 520 according to the requirement of the correlator 519. Of course, one of ordinary skill in the art are perceives that, in order to avoid the searching speed of the correlator 530, the data receiving register 520 includes two different regions for storing the IF data with different time periods, each having 1 ms. The interface controller 519 uses the two memory regions in turn so that the data receiving register 520 serves as a ping-pong buffer.

Figure 6:
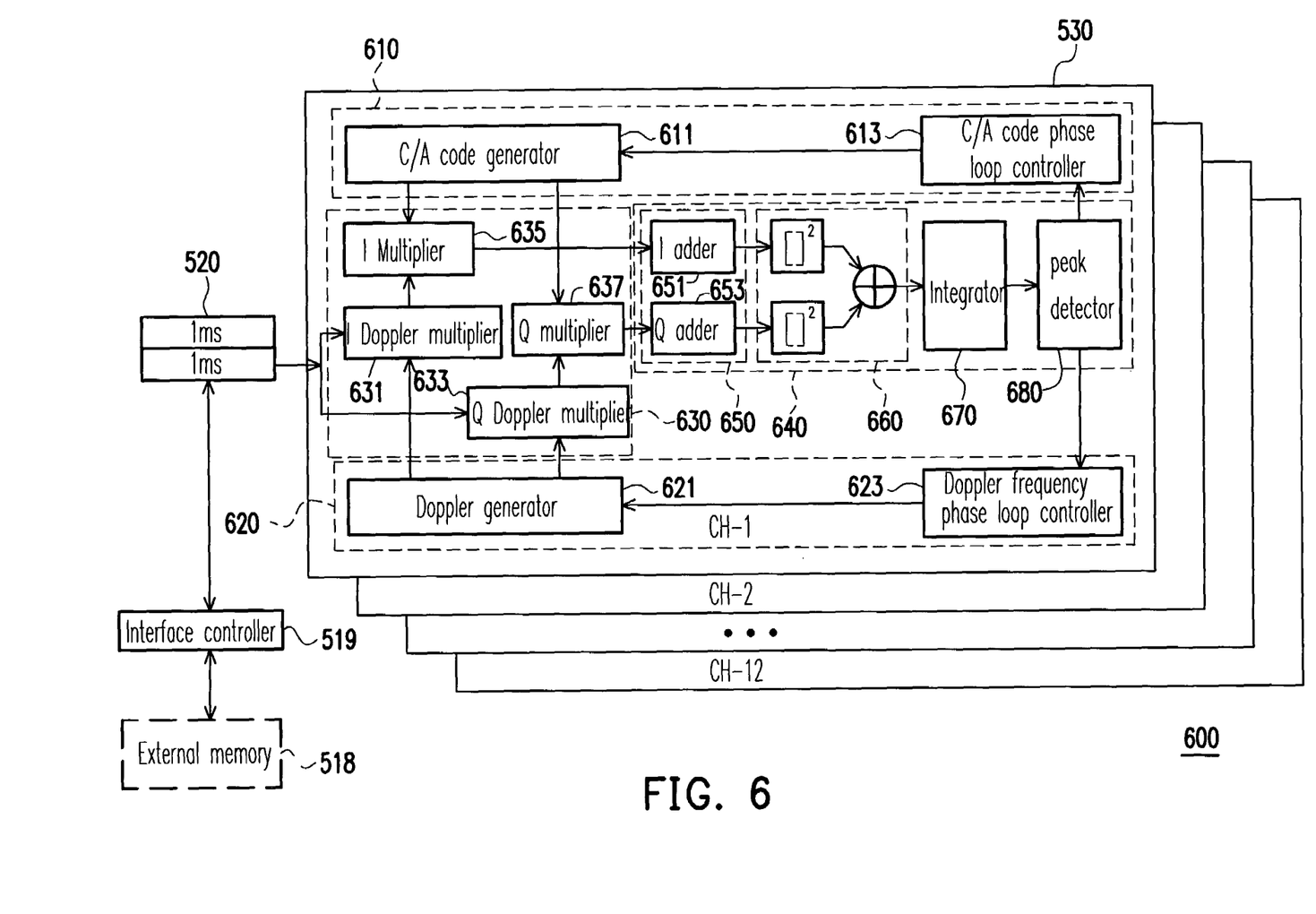
FIG. 6 is a schematic block diagram showing a preferred correlating circuit of the present invention.

The correlator 530 receives the IF data from the data receiving register 520, sequentially and in parallel generating a portion of bits of a C/A code representing the satellite, and sequentially generates a portion of bits of a corrected frequency code of Doppler effect for sequentially multiplying the portion of bits of the C/A code from the C/A code generating unit, the portion of bits of the corrected frequency code from the parallel Doppler generating unit, and the IF data, adding products therefrom for generating a total summation value and searching a maximum thereof for identifying the satellite transmitting the IF data. The calculating circuit thereof is shown in FIG. 6. The correlator 530 includes a multiplication capability by, for example, 31, 32, 33, 62, 64, 66, 128, or more bits for each time.

In order to enhance the searching speed, the GPS receiver further comprises N correlators, which have a structure similar to that of the correlator, wherein N is preferred 12 for searching and tracking data of different satellites.

The data extractor 540 is coupled to the correlator 530 and adapted to extract a navigation data from the IF data. The navigation processor 550 is coupled to the data extractor and adapted to receive the navigation data for generating a longitude-latitude data and a standard time data which can be transmitted to a computer having, for example, geographic information system (GIS), for providing geographic information of the user, such as location and direction of the user.

FIG. 6 is a schematic block diagram showing a preferred correlating circuit of the present invention. The correlating circuit 600 of the GPS receiver comprises: a C/A code generating unit 610, a Doppler generating unit 620, a multiplication unit 630 and digital summation and peak detector 640. The C/A code generating unit 610 comprises a C/A code generator 611 and a C/A code phase loop controller 613. The Doppler generating unit 620 comprises a Doppler generator 621 and a Doppler frequency loop controller 623. The multiplication unit 630 comprises an I Doppler multiplier 631, a Q Doppler multiplier 633, an I multiplier 635 and a Q multiplier 637. The summation and peak detector 640 comprises a digital adder 650 having an I adder 651 and a Q adder 653, a square and radical calculator 660, an integrator 670 and a peak detector 680. The operation of the system is described below.

The 20-ms IF data transmitted from the RF front end 510 are stored in the external memory 518 of FIG. 5. The interface controller 519 sequentially couples the IF data from the external memory 518 to the data receiving register 520 according to the requirement of the correlator 530, waiting for the multiplication with the C/A code or the offset thereof and the Doppler corrected frequency code as shown in formula (1). The C/A code generator 611 controlled by the C/A code phase loop controller 613 generates and outputs a portion of bits of the C/A code and the C/A code having different offset representing different satellites in parallel. For example, in the C/A code with 1023 bits, it can generate and output 64 bits for 16 times.

Similarly, the Doppler generator 621 controlled by the Doppler frequency loop controller 623 generates and outputs the portion of bits of the corrected frequency code in parallel. For example, in the corrected frequency code with 1023 bits, it can generate and output 64 bits for 16 times. The corrected frequency code includes, for example, I and Q corrected frequency codes. The phase angle difference of the I and Q corrected frequency codes is 90° for correcting phase error during the sampling.

The I Doppler multiplier 631 and the Q Doppler multiplier 633 receive the I and Q corrected frequency codes generated from the Doppler generator 621 which are multiplied with the IF data from the data receiving register 520. The I multiplier 635 and the Q multiplier 637 receive the output from the I Doppler multiplier 631 and the Q Doppler multiplier 633 which are multiplied with the C/A code generated from the C/A code generator 611. The products are outputted to the I adder 651 and the Q adder 653.

The I adder 651 and a Q adder 653 receive the products from the I multiplier 635 and the Q multiplier 637 for generating the total value of each output bits. For example, in the product with 64 bits, each of the I adder 651 and the Q adder 653 outputs the I summation and Q summation with 1023 bits after 16 multiplying operations. The I and Q summations are outputted to the square and radical calculator 660 for square-rooting a quadratic sum thereof. The integrator 670 serves to integrate the values generated therefrom for 1-20 ms.

Finally, the peak detector 680 search the maximum among the IF data, the C/A code and the C/A code having different offset generated from the C/A code generator 611, and the corrected frequency code generated form the Doppler generator 621 for identifying the satellite transmitting the IF data. For example, if there are 24 satellites, there are 1023 C/A codes 1023 with different offset due to the C/A code has 1023 bits and the there are 20 corrected frequency codes, the peak detector 680 searching whether the satellites have the peak and identify the satellite during the 24×1023×20 multiplying operations. Of course, one of ordinary skill in the art perceives that the products vary with the number of the sampled data.

Accordingly, the present invention has following advantages:
1. The present invention sequentially and in parallel generates the portion of bits of the C/A code representing the satellite, sequentially and in parallel generates the portion of bits of the corrected frequency code of Doppler effect, and sequentially outputs the portion of bits of the corrected frequency code therefrom for multiplying the data and the IF data and for adding the products therefrom for generating the total summation value. Therefore, the digital calculating circuit can be simplified and the performance thereof is improved.
2. Without analog adders, the present invention provides the process portable correlating circuit and the GPS receiver thereof.
3. The substitution of the internal memory by the external memory for the 20-ms IF data can reduce the costs.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A correlating circuit of a Global Positioning System (GPS) receiver, comprising:
    a data receiving register, adapted to store a sampled digital data as an IF data;
    an interface controller coupled to the data receiving register and an external memory, for sequentially transmitting data sent from an RF front end from the external memory to the data receiving register; and
    a correlator coupled to the data receiving register, adapted to receive the IF data and identify a transmission satellite transmitting the IF data among a plurality of satellites, according to a operation of the IF data, each of C/A codes of the satellites, and each of corrected frequency codes for correcting Doppler effect, comprising:
    a C/A code generating unit, sequentially and in parallel generating and outputting a portion of bits of each of the C/A codes representing each of the satellites;
    a Doppler generating unit, sequentially and in parallel generating and outputting a portion of bits of each of the corrected frequency codes for correcting Doppler effect;
    a multiplication unit coupled to the C/A code generating unit and the Doppler generating unit, sequentially multiplying the portion of bits of each of the C/A codes from the C/A code generating unit, the portion of bits of each of the corrected frequency codes from the parallel Doppler generating unit, and the IF data; and
    a digital summation and peak detector coupled to the multiplication unit, adding products therefrom for generating a plurality of summation values and searching a maximum among the summation values thereof for identifying the satellite transmitting the IF data.

2. The correlating circuit of a GPS receiver of claim 1, wherein the data receiving register has two regions for storing the IF data with different time periods, and the interface controller uses the memory regions in turn.

3. The correlating circuit of a GPS receiver of claim 1, wherein the C/A code generating unit comprises a C/A code phase loop controller adapted to sequentially output the portion of bits of each of the C/A codes.

4. The correlating circuit of a GPS receiver of claim 1, wherein the Doppler generating unit comprises a Doppler frequency loop controller adapted to sequentially output the portion of bits of each of the corrected frequency codes.

5. The correlating circuit of a GPS receiver of claim 1, wherein the summation and peak detector comprises:
    a digital adder coupled to the multiplication unit, adapted to adding the products therefrom for generating a plurality of I summations and a plurality of Q summations;
    a square and radical calculator coupled to the digital adder, for receiving the I and Q summations and square-rooting a plurality of quadratic sums of the I and Q summations thereof;
    an integrator coupled to the square and radical calculator, adapted to integrated the quadratic sums therefrom during a period of time; and
    a peak detector coupled to the integrator, adapted to search a maximum of the integrated quadratic sums for identifying the transmission satellite transmitting the IF data among the satellites.

6. The correlating circuit of a GPS receiver of claim 5, wherein the period of time is adjustable.

7. The correlating circuit of a GPS receiver of claim 1, wherein the multiplication unit can multiply 31, 32, 33, 62, 64, 66, 128 or more bits each time.

8. A global positioning system (GPS) receiver, comprising:
    an RF front-end, adapted to receive, demodulate and sampled a RF signal for generating an IF data and storing in an external memory;
    a data receiving register;
    an interface controller, coupling to the data receiving register and the external memory, for sequentially removing the IF data from the external memory to the data receiving register;
    a correlator adapted to receive the IF data and identify a transmission satellite transmitting the IF data among a plurality of satellites, according to a operation of the IF data, each of C/A codes of the satellites, and each of corrected frequency codes for correcting Doppler effect, comprising:
    a C/A code generating unit, sequentially and in parallel generating and outputting a portion of bits of each of the C/A codes representing each of the satellites;
    a Doppler generating unit, sequentially and in parallel generating and outputting a portion of bits of each of the corrected frequency codes for correcting Doppler effect;
    a multiplication unit coupled to the C/A code generating unit and the Doppler generating unit, sequentially multiplying the portion of bits of each of the C/A codes from the C/A code generating unit, the portion of bits of each of the corrected frequency codes from the parallel Doppler generating unit, and the IF data; and
    a digital summation and peak detector coupled to the multiplication unit, adding products therefrom for generating a plurality of summation values and searching a maximum among the summation values thereof for identifying the satellite transmitting the IF data;
    a data extractor coupled to the correlating circuit, adapted to extract a navigation data from the IF data; and
    a navigation processor coupled to the data extractor, adapted to receive the navigation data for generating a longitude-latitude data and a standard time data.

9. The GPS receiver of claim 8, wherein the data receiving register has two regions for storing the IF data with different time periods, and the interface controller uses the memory regions in turn.

10. The GPS receiver of claim 8, wherein the C/A code generating unit comprises a C/A code phase loop controller adapted to sequentially output the portion of bits of each of the C/A code.

11. The GPS receiver of claim 8, wherein the Doppler generating unit comprises a Doppler frequency loop controller adapted to sequentially output the portion of bits of each of the corrected frequency code.

12. The GPS receiver of claim 8, wherein the summation and peak detector comprises:
   a digital adder coupled to the multiplication unit, adapted to adding the products therefrom for generating a plurality of I summations and a plurality of Q summations;
   a square and radical calculator coupled to the digital adder, for receiving the I and Q summations and square-rooting a plurality of quadratic sums of the I and Q summations thereof;
   an integrator coupled to the square and radical calculator, adapted to integrate the quadratic sums therefrom during a period of time; and
   a peak detector coupled to the integrator, adapted to search a maximum of the integrated quadratic sums for identifying the transmission satellite transmitting the IF data among the satellites.

13. The GPS receiver of claim 12, wherein the period of time is adjustable.

14. The GPS receiver of claim 12, wherein the multiplication unit can multiply 31, 32, 33, 62, 64, 66, 128 or more bits each time.

15. The GPS receiver of claim 8, further comprises N correlators.

16. The GPS receiver of claim 15, wherein N is 8, 10, 12 or more.

* * * * *